US011939087B2

(12) United States Patent
Denham

(10) Patent No.: US 11,939,087 B2
(45) Date of Patent: Mar. 26, 2024

(54) AUTONOMOUS COMPLIANCE CONTROLLED GENERIC MOORING STATION FOR AN ON-ORBIT SYSTEM

(71) Applicant: The Aerospace Corporation, El Segundo, CA (US)

(72) Inventor: Donald Wayne Denham, Redondo Beach, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 0 days.

(21) Appl. No.: 17/694,579

(22) Filed: Mar. 14, 2022

(65) Prior Publication Data
US 2023/0286677 A1 Sep. 14, 2023

(51) Int. Cl.
B64G 1/64 (2006.01)
B64G 1/10 (2006.01)
H01F 7/02 (2006.01)

(52) U.S. Cl.
CPC ........... *B64G 1/646* (2013.01); *H01F 7/0252* (2013.01); *B64G 1/1078* (2013.01)

(58) Field of Classification Search
CPC .............................. B64G 1/646; B64G 1/1078
USPC ...................................................... 244/172.5
See application file for complete search history.

(56) References Cited

U.S. PATENT DOCUMENTS

| 7,543,779 | B1* | 6/2009 | Lewis | B64G 1/646 |
| | | | | 244/172.4 |
| 7,815,149 | B1* | 10/2010 | Howard | B64G 1/646 |
| | | | | 244/172.4 |
| 11,008,121 | B2* | 5/2021 | Kreisel | B64G 1/12 |
| 11,305,897 | B2* | 4/2022 | West | B64G 1/646 |
| 11,728,592 | B2* | 8/2023 | Goff | H01R 13/631 |
| | | | | 439/39 |
| 2019/0341721 | A1* | 11/2019 | Goff | H01R 13/514 |
| 2020/0361641 | A1* | 11/2020 | Dharmaraj | F16B 7/042 |
| 2021/0086923 | A1* | 3/2021 | Halsband | B64G 1/42 |
| 2022/0332443 | A1* | 10/2022 | Roopnarine | B25J 9/046 |
| 2022/0332444 | A1* | 10/2022 | Roopnarine | B64G 1/36 |
| 2023/0100434 | A1* | 3/2023 | Hegenbart | F16L 51/02 |
| | | | | 411/103 |
| 2023/0108618 | A1* | 4/2023 | Denham | B64G 1/428 |
| | | | | 244/173.1 |

FOREIGN PATENT DOCUMENTS

| CN | 109515765 A | * | 3/2019 | |
| CN | 114701674 A | * | 7/2022 | |
| CN | 217145665 U | * | 8/2022 | |
| CN | 115703546 A | * | 2/2023 | |
| WO | WO-2006068884 A1 | * | 6/2006 | |
| WO | WO-2021183409 A1 | * | 9/2021 | B64G 1/641 |

* cited by examiner

Primary Examiner — Christopher P Ellis
(74) Attorney, Agent, or Firm — LeonardPatel PC

(57) ABSTRACT

An autonomous compliance controlled generic mooring station includes a pair of mooring systems connected to each other. The pair of mooring systems includes a pair of mooring interfaces, allowing the pair of mooring systems to change between a mooring state and a release state. One of the pair of mooring interfaces includes an electropermanent magnet and the other one of the pair of mooring interfaces includes a ferromagnetic plate. The electropermanent magnet and the ferromagnetic plate are configured to connect the pair of mooring systems together.

13 Claims, 15 Drawing Sheets

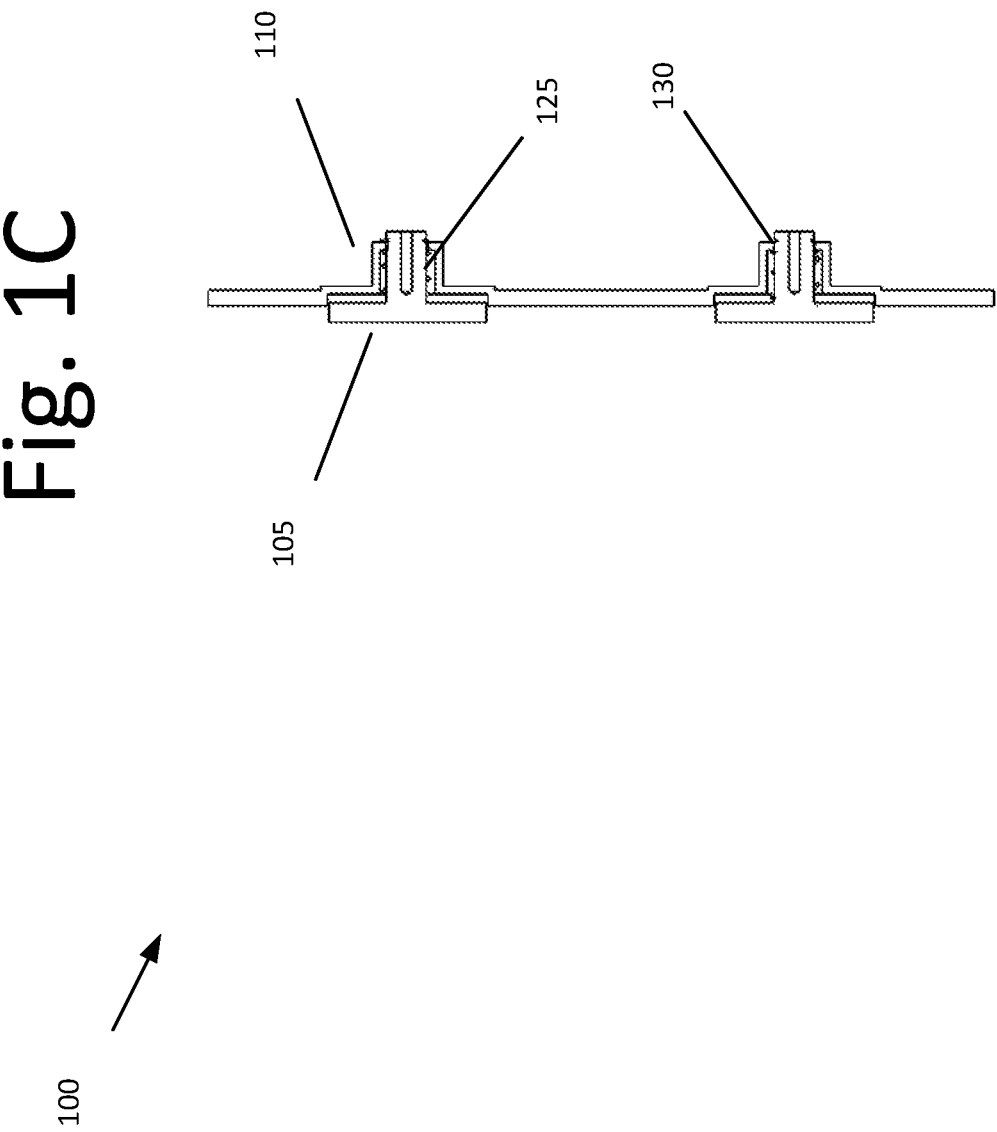

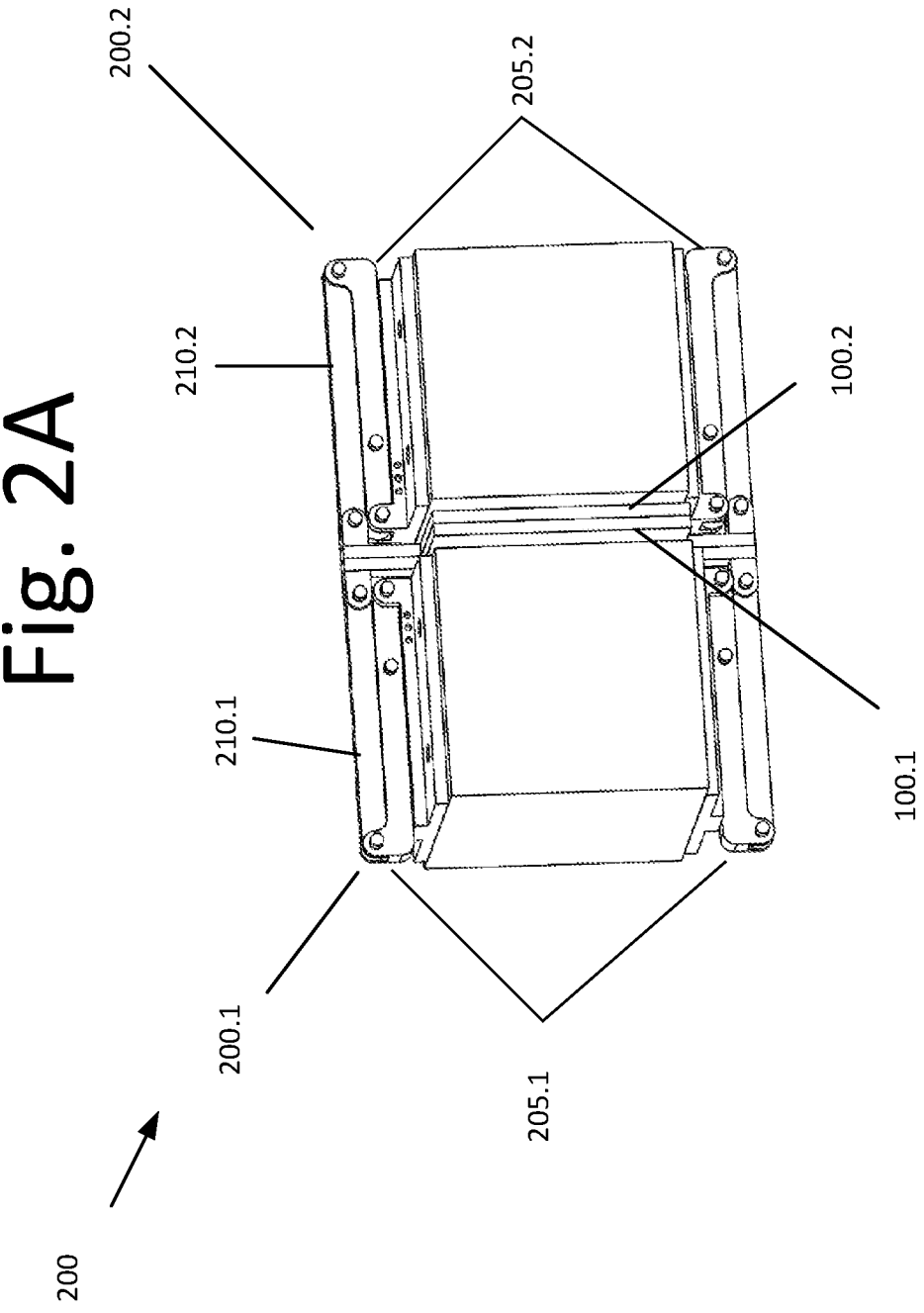

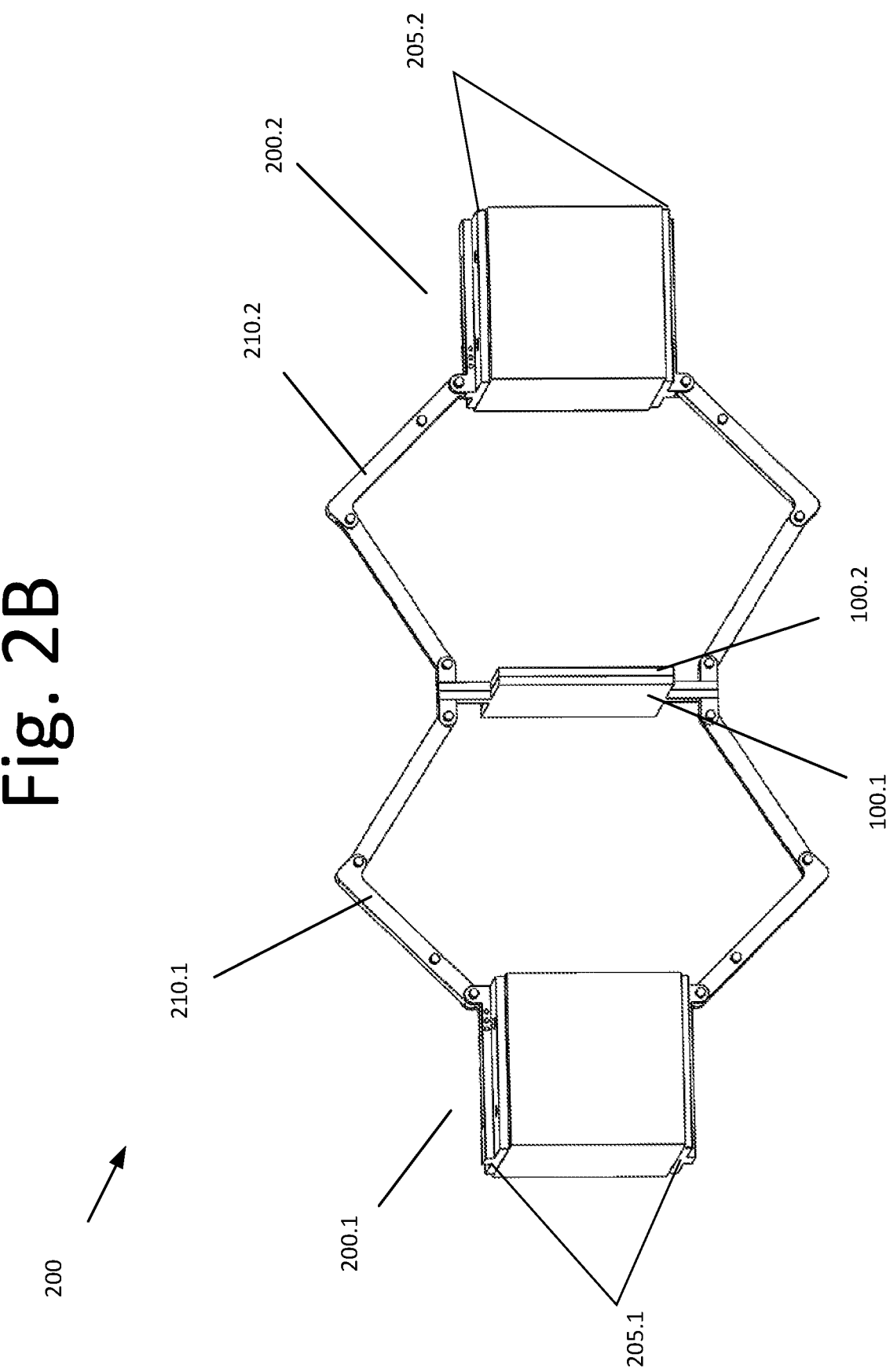

500

700

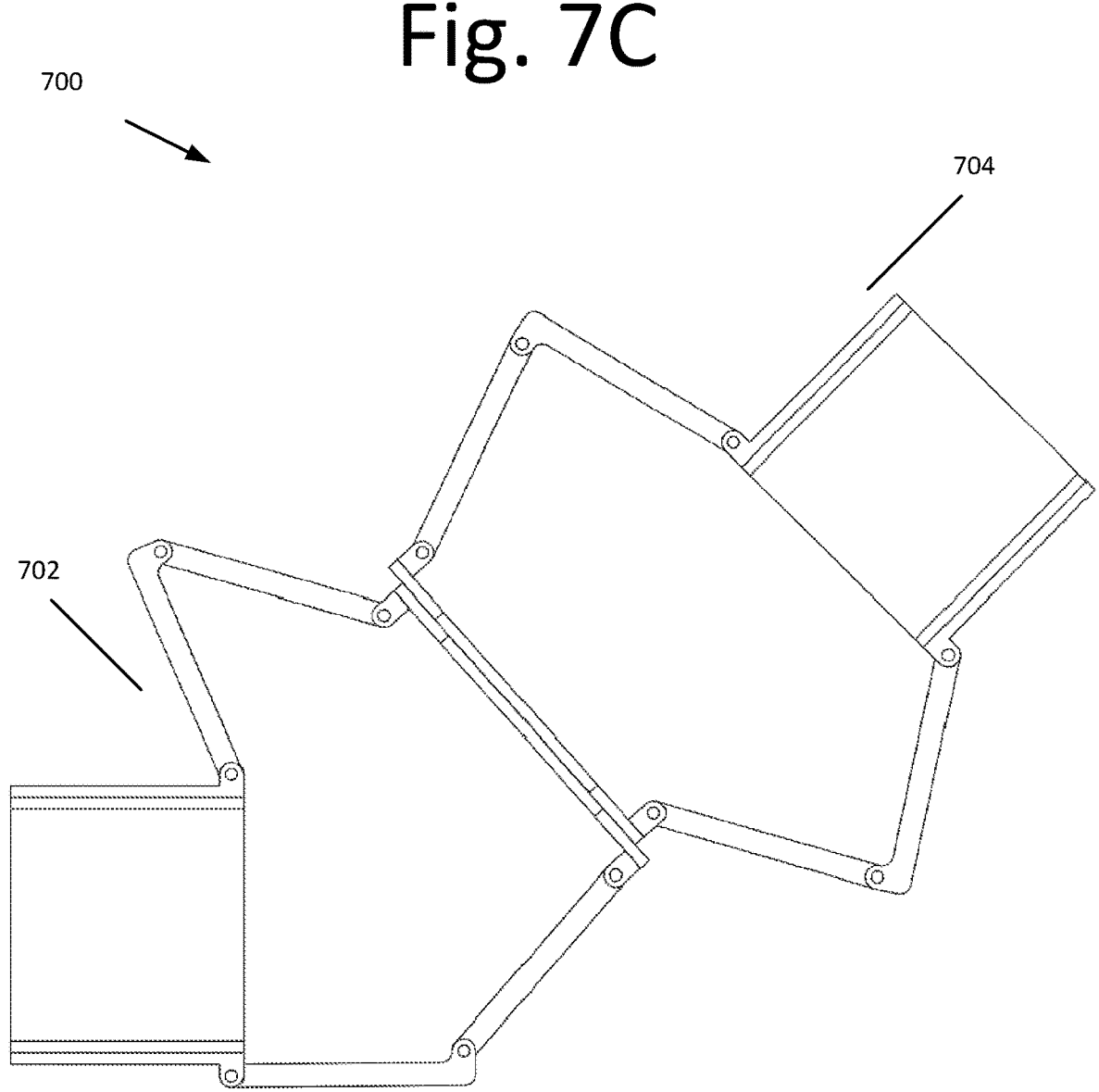

AUTONOMOUS COMPLIANCE CONTROLLED GENERIC MOORING STATION FOR AN ON-ORBIT SYSTEM

FIELD

The present invention relates to on-orbit satellite mooring stations, and more particularly, to a mechanical structure configured to support autonomous on-orbit assembly, servicing, resupply, and construction missions.

BACKGROUND

Current systems use bolted mechanical interfaces and connectors with hundreds of wired signals. These systems are assembled on the ground (terrestrially) and then are launched as a single entity. These systems are not suited for on-orbit assembly, repair, or servicing.

The mechanical interfaces for these terrestrial systems require high dexterity for assembly that is beyond the capability of on-orbit assembly with robots. The insertion of bolts and electrical pin connector are fraught with subtle movements that are not easily replicated on-orbit by robotic assembly. The assembly robots would need several highly specific end effector tools to be developed for each interface to ensure proper seating of connectors and bolted interfaces. For example, these tools would be developed on the ground and then added to the space vehicle, which would be performing the assembly or service. These tools and interfaces tend to be one off designs that drive additional cost and complexity into the missions. The goal of the generic interface is that there are no tooling required and the interface can be reused.

Accordingly, an improved autonomous mooring system may be beneficial to support the assembly of modular spacecraft on-orbit.

SUMMARY

Certain embodiments of the present invention may provide solutions to the problems and needs in the art that have not yet been fully identified, appreciated, or solved by current mooring systems technologies. For example, some embodiments of the present invention pertain to an autonomous mooring system providing a robust electrical and communication connection between adjacent systems that is tolerant of mooring rotational and translational misalignments.

In one embodiment, an autonomous compliance controlled generic mooring station includes a pair of mooring systems connected to each other. The pair of mooring systems includes a pair of mooring interfaces, allowing the pair of mooring systems to change between a mooring state and a release state. One of the pair of mooring interfaces includes an electropermanent magnet and the other one of the pair of mooring interfaces includes a ferromagnetic plate. The electropermanent magnet and the ferromagnetic plate are configured to connect the pair of mooring systems together.

In another embodiment, a method for performing an on-orbit connection between a pair of mooring systems includes extending and guiding each mooring system in the pair of mooring systems together. The method also includes upon establishing contact between the pair of mooring systems, activating an EPM on one of the pair of mooring systems to hold a pair of mooring plates together. The method further includes retracting mooring linkages associated with each mooring system so each mooring system is in a retracted state.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A-C are diagrams illustrating various views of contactor (or mooring) plate, according to an embodiment of the present invention.

FIGS. 2A and 2B are diagrams illustrating two (2) attached systems in the fully retracted or moored position, according to an embodiment of the present invention.

FIGS. 7A-7F are diagrams illustrating on-orbit mooring system facilitating the connection between two mooring systems, according to an embodiment of the present invention.

DETAILED DESCRIPTION OF THE EMBODIMENTS

Figure 1A:
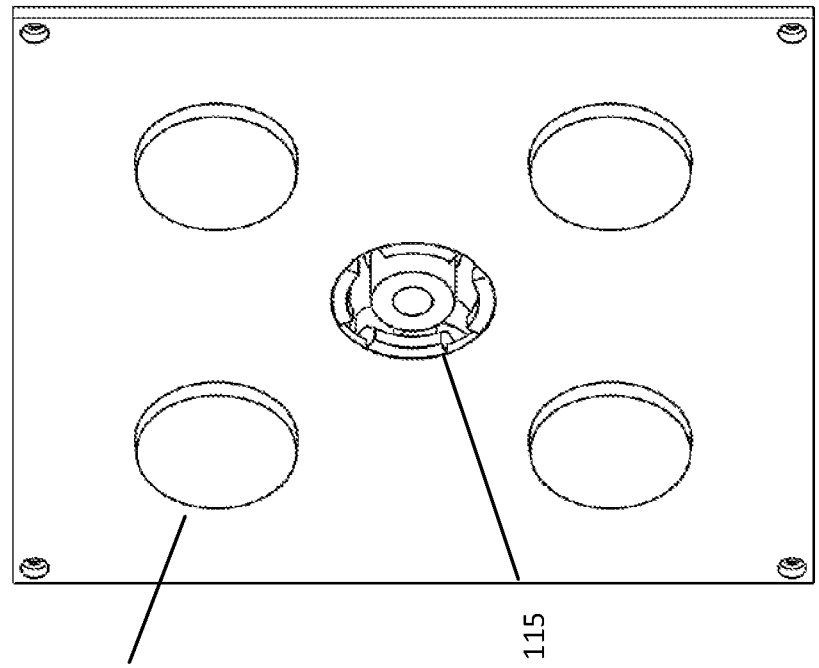

Some embodiments of the present invention generally pertain to an autonomous mooring system providing a robust electrical and communication connection between adjacent systems that is tolerant of mooring misalignments. The autonomous mooring system makes it possible to pass power and serial communication across the interface at speeds up to 100 MBPS. In certain embodiments, however, the autonomous mooring system is capable of supporting data rates up to 1 GHz.

The autonomous mooring system addresses the problem of establishing electrical and communication connections between adjacent space vehicles (SVs) that are robust against misalignments during the mooring operations. The first problem is associated with connecting to a remote SV that is in close proximity (e.g., 2 meters or less). This system allows for the connections to be made in a manner that is robust to the inherent misalignments between the SVs. The interface is mechanically simple, which is a desirable trait, that could lead to widespread adoption.

This system solves the "first contact" problem. This is a tricky operation for non-autonomous systems as the differences in velocity of the SVs can over stress grapplers, linkages, and joints. This system solves this first contact problem by detecting stresses in the mechanism and actuating the system to achieve the compliance-controlled behavior which is a key feature of the system. The forces and moments are sensed by strain gages embedded in the mooring system linkage arms (see FIG. 2A, items 210.1 and 210.2) and torque sensors placed in the joints of the linkage arms. The system in some embodiments starts to actuate once the forces and torques are detected in the mooring system. The system may resist the externally applied forces in a manner that keeps the stress in the system at the desired level to arrest motion without damaging the system. In this way, the compliance of the system is continuously controlled to arrest the relative motion between the SVs.

The autonomous mooring system utilizes spring loaded contactors to simulate the nearly featureless interface concept. For instance, the spring-loaded contactors are brought into contact with a minimal force in the range of 1-5 lbf per contactor. The contacting force is provided by an electropermanent magnet (EPM) located at the center of the interface. Mooring plate interfaces each comprise one half of the mooring system. The two (2) mooring plate interfaces are brought into contact with one side having the EPM and the other side having a ferromagnetic plate. The action of attaching the EPM to the ferromagnetic plate provides the mooring force and preload for the contactors. Once connected, the system passes power and communication signals between the attached systems.

The prototype autonomous mooring system was built with aluminum contacts and an acrylonitrile butadiene styrene (ABS) plastic housing. In certain embodiment, the on-orbit system may be built with space rated material, such as carbon fiber and stainless steel. During testing, two additional contactors were made, which had aluminum buttons; however, the housing was 3-D printed from polylactic acid (PLA). PLA is a thermoplastic monomer derived from renewable, organic sources such as corn starch or sugar cane. It should be appreciated that the final product may be built with space rated materials such as carbon fiber, magnetic and non-magnetic stainless steels, epoxies, plastics, and other materials generally accepted as spaceworthy.

A testbed was also developed for connecting between the prototype mooring plate and the contactors. Two primary proof-of-concept tests were performed. The first test determined the maximum data rate that could be achieved when a simulated serial communication signal was passed across the connection and the second test was to determine if sufficient power could be passed across the interface to power a remote device.

The power transfer testing was performed by passing power and ground signals across the mooring interface. It was demonstrated that sufficient power was available to boot a remote device and display its status.

A conceptual finite element model (FEM) of the magnetic properties of the two-piece non-contact transformer was also developed that showed useful magnetic flux is available in the remote half of the transformer that could be converted into electrical power.

The serial communication demonstration testing was performed by transferring video data across the contactors. A web camera was connected to a Raspberry Pi (Rpi) microcomputer and the video data was transferred to a second Rpi via a 1 GB Ethernet connection across the contactors. The data was ultimately displayed and recorded on a laptop.

Figure 1B:
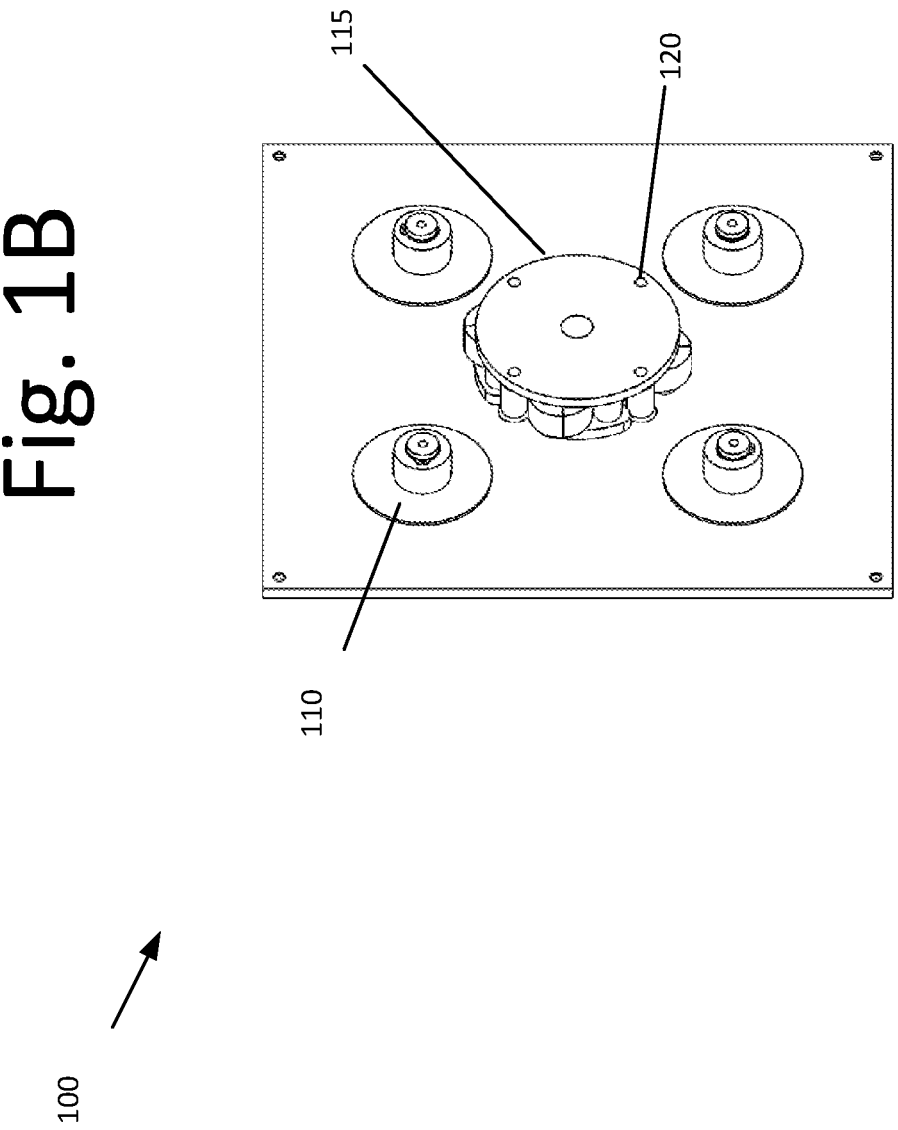

FIGS. 1A-C are diagrams illustrating various views of contactor (or mooring) plate 100, according to an embodiment of the present invention. FIG. 1A shows the contacting surface of contactor plate 100. Four (4) contactors 105 are placed around centrally located EPM 115. FIG. 1B shows the rear view of contactor plate 100 with four (4) contactor housings 110 and rear view of the EPM 115 and locations of the four (4) rigid attachment points 120 for the EPM to mooring plate 100. FIG. 1C show a cross-section view of the mooring plate 100, contactor housings 110, and contactors 105. The view also shows the internal spring 125 and snap ring 130 that form the spring-loaded system.

The mooring system offers several benefits over existing grappler systems. First, and foremost, the mooring system allows for larger angular misalignments than existing system. For example, the mooring plates can be rotated relative to each other about their respective center points by an angle that allows the contactors to remain overlapped. For the prototype system, the plates may be rotated through a 33-degree arc and remain overlapped. Second, the mooring system allows for the plates to be translated horizontally or vertically relative each other by one contactor diameter. For the prototype system, the contactors are one (1) inch in diameter.

Additionally, the system may accommodate both rotational and translational misalignments concurrently to the extent that all contactors remain overlapped with their corresponding mate. Furthermore, the mooring system uses an electrically switched EPM device to generate the clamping forces required to hold the plates together. For example, the EPM is switch on or off by applying short current pulses based on the electrical characteristics of the associated control coil, which typically is on the order of 2 to 4 milliseconds in duration. This allows the automated control system to rapidly react to the plates coming into contact. The automated control system may also release the attached SV if and when an overload condition is detected before permanent damage is sustained.

Conversely, current systems may rely on precisely positioned mechanical and electrical interfaces with little tolerance for angular (typically less than 3 degrees) and translational (typically less the 0.010 inches) misalignments. These current systems often use guide pins or other features to help align the systems; however, these devices cannot be used effectively on system that have relative velocities as they are not able to align at the speed needed to prevent an uncontrolled collision of the SVs. Systems that use robotic arm and grippers suffer from similar problems. The grippers attempt to grab features on the opposing SV which are moving relative to the gripper. These systems require expensive high throughput computer vision system that attempt to identify the attachment points and guide the gripper to the attachment points. The grippers then must close on the attachment feature all in a time frame before the feature moves out of reach and an uncontrolled collision between the SVs occurs.

FIGS. 2A and 2B are diagrams illustrating an autonomous mooring system 200, according to an embodiment of the present invention. In this embodiment, FIG. 2 is a diagram illustrating two (2) attached systems 200.1 and 200.2 in the fully retracted or moored position, according to an embodiment of the present invention. In the fully retracted or moored position, the linkages are in the low compliance/high mechanical stiffness state. Low compliance/high mechanical stiffness states, for purposes of explanation, may be defined as areas of operation where externally applied forces are reacted through the mechanical structure of the linkage and are typically defined by the linear portion of a stress-strain curve. High compliance/low mechanical stiffness states, for purposes of explanation, may be defined as areas of operation where externally applied forces are reacted through the elasticity of the structure typically by moving the joints of the system to create a non-linear stress-strain curve where peak loads are controlled. This tailoring of the stress-stain relationship is a key feature of compliance-controlled systems.

Each mooring (or contactor) plate 100.1 and 100.2 is attached to two (2) compliance-controlled mechanisms 205.1 and 205.2, respectively. Compliance controlled mechanisms 205.1 and 205.2 are configured to react externally applied forces and moments in a manner that allows for variable levels of compliance in the system response.

After contact has been established, compliance-controlled mechanisms 205.1 and 205.2 maneuver attached systems 200.1 and 200.2 into the fully retracted and moored position by means of springs, servomotors, or other motive devices (not pictured). While in this fully retracted state, separating loads applied to the system cause increase stress in compliance-controlled mechanisms 205.1 and 205.2. Compliance-controlled mechanisms 205.1 and 205.2 transition to the high compliance/low stiffness state when the resulting force exceed the desired threshold (e.g., when the calculated stress in the mechanism is greater than 50% of the yield stress for a link or joint of the mechanism). For instance, if a disturbance were to cause moored system 200.2 to be pulled away from system 200.1 compliance control mechanisms 205.1 and 205.2 would attempt to react the loads without allowing the system to become separated. However, if the applied load was large enough (e.g., in excess of a predefined stress limit like 50% of the yield stress of a link or joint), compliance control mechanisms 205.1 and 205.2 may switch states, allowing moored system 200.2 to move away from system 200.1. In doing so, compliance control mechanisms 205.1 and 205.2 absorb the energy from the transitory loads preventing damage to both systems 200.1 and 200.2. After the transitory loads have passed, the systems return to the fully retracted position. For an automated system, force and moment data are received from the embedded sensors (not shown) in compliance control mechanisms 205.1 and 205.2. The data are processed via algorithms in an embedded processor and compared to stored values. If the sensed values exceed the threshold values, system 200.1 and 200.2 react in a manner consistent with a desired response. For a purely mechanical system, the linkages are designed in a manner that spontaneously releases when an external load exceeds the preloaded value.

In FIG. 2B, same attached systems 200.1 and 200.2 are shown in the released state or extended position. In the released state or extended position, compliance-controlled mechanisms 205.1 and 205.2 behave in a high compliance like manner. In certain embodiments, high compliance like manner refers to performance areas with high compliance/low mechanical stiffness states. For purposes of explanation, this may be defined as areas of operation where externally applied forces are reacted through the elasticity of the structure typically by moving the joints of the system to create a non-linear stress-strain curve where peak loads are controlled. This tailoring of the stress-stain relationship is a key feature of compliance-controlled systems. That is for small changes in the applied load, the mechanism has relatively large displacements. The high compliance behavior is controlled by forces and moments applied to the mechanism joints. These forces and moments are controlled by springs, servomotors, or other motive devices (not shown). The motive forces and moments are passively applied or via open or closed loop controllers (not shown). Compliance controlled mechanisms 205.1 and 205.2 provide the routing for the cables 210.1 and 210.2 that power the EPM, transfer power, and provide serial communications.

Figure 3:
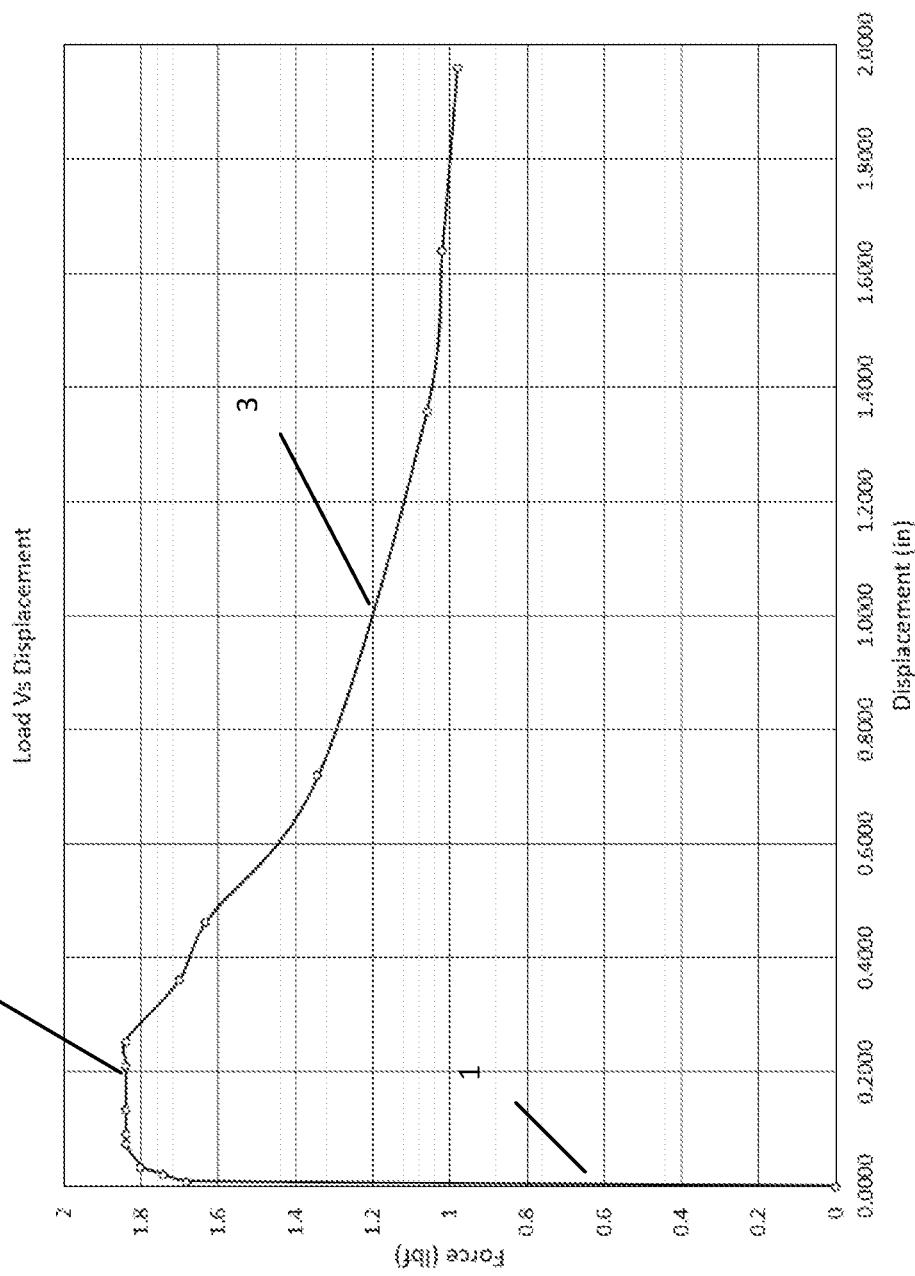
FIG. 3 is a graph illustrating a bimodal compliance curve for a mechanical system, according to an embodiment of the present invention.

FIG. 3 is a graph 300 illustrating a bimodal compliance curve for a mechanical system, according to an embodiment of the present invention. Graph 300 represents test data for a passive spring powered compliance-controlled mechanism, similar to that shown in FIGS. 2A and 2B. From graph 300, it can be seen that a region (1) of low compliance and high stiffness starts at the origin and rapidly rises to 1.7 lbf applied load with a displacement of 0.009 inches. Graph 300 then shows a transition region (2) where the applied force continues to rise as the displacement starts to increase reaching a peak applied load 1.84 lbf and stays relatively constant from 0.035 inches to 0.25 inches of displacement. Finally, graph 300 shows a high compliance region (3) where the applied load starts to fall over a large range of motion. Similar graphs can be generated by active application of torques at the joints of the mechanism. These torques may be controlled in a manner to achieve highly specific compliance behavior over the available range of motion.

Figure 4:
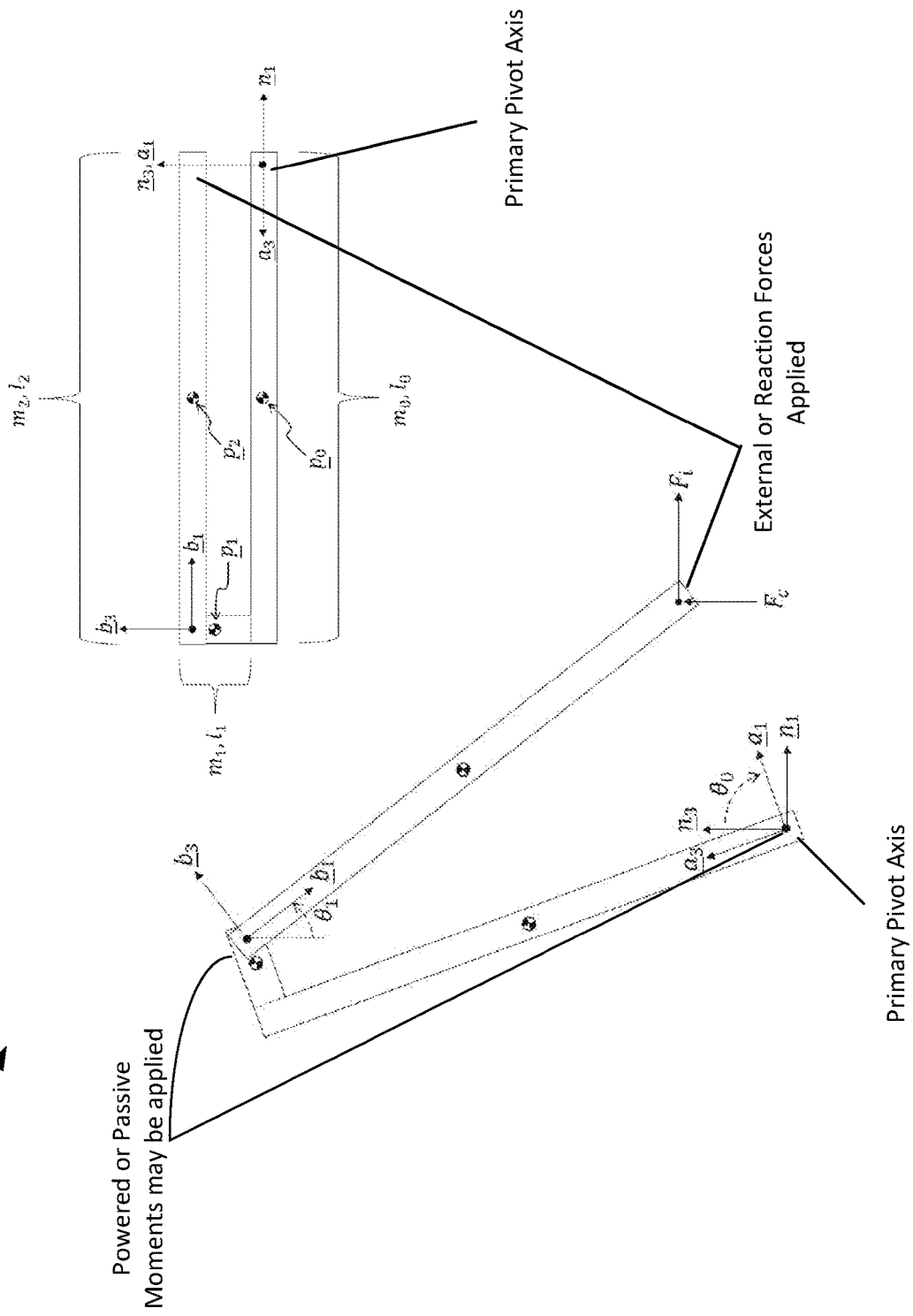
FIG. 4 is a diagram illustrating a generalized kinematics model for a two-link variable compliance arm, according to an embodiment of the present invention.

FIG. 4 is a diagram illustrating a generalized kinematics model 400 for a two-link variable compliance arm, according to an embodiment of the present invention. The illustration shows the location of where forces can be applied, Fi and Fc. The model would then be run to determine the bimodal compliance response of the mechanism. In one study a preloaded rotational spring is applied at one rotating joint and the resulting moment verses displacement angle curves were generated. The generalized nature of the model allows for applied forces and moments to be studied to design the desired compliance behavior.

Figure 5:
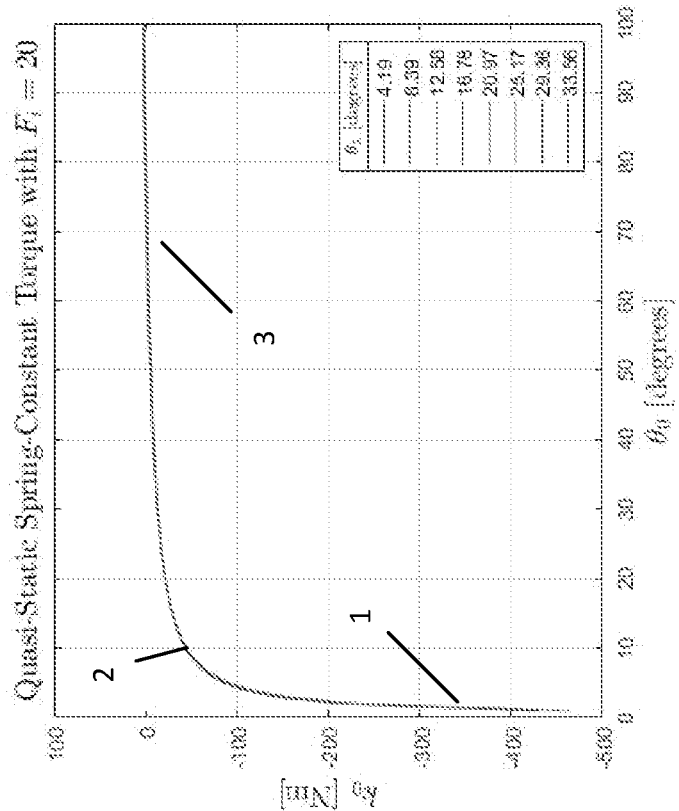
FIG. 5 is a graph illustrating a bimodal compliance curve for a simulated mechanical system with applied moments, according to an embodiment of the present invention.

FIG. 5 is a graph 500 illustrating a bimodal compliance curve for a simulated mechanical system with applied moments, according to an embodiment of the present invention. Graph 500 represents a tailored compliance response for a compliance-controlled mechanism with applied torques at the joints of the mechanism. See, for example, FIG. 4. The response shows that by varying the torques applied at the joints a specific response can be created. In graph 500, there are 3 regions of the bimodal response—region (1) shows the low compliance/high mechanical stiffness response, region (2) shows the transition from low compliance to high compliance response, and region (3) shows the high compliance/low mechanical stiffness response.

Figure 6:
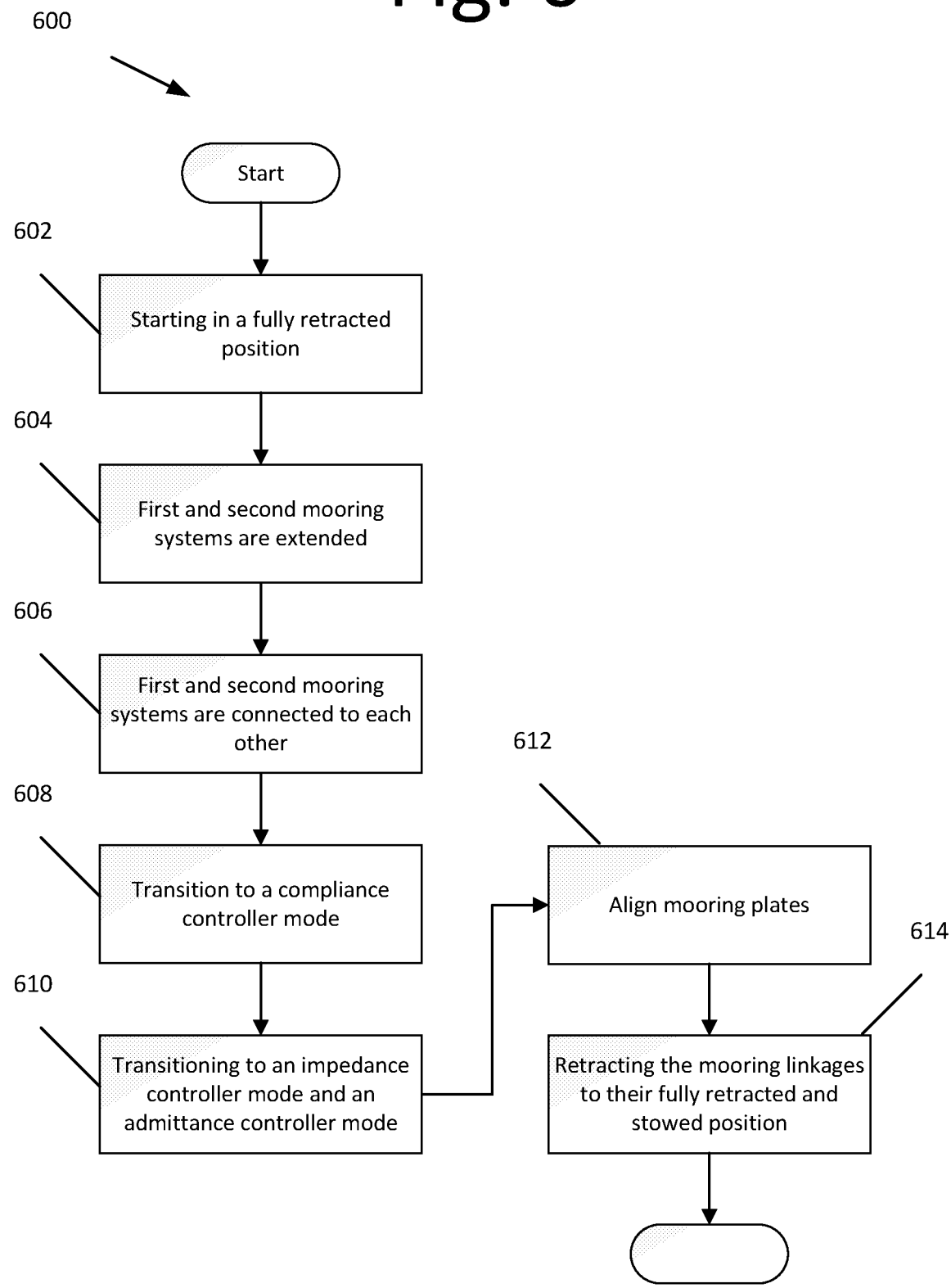
FIG. 6 is a flow diagram illustrating a method for performing on-orbit connection via each SVs' mooring system, according to an embodiment of the present invention.

FIG. 6 is a flow diagram illustrating a method 600 for performing on-orbit connection via each SVs' mooring system, according to an embodiment of the present invention.

Figure 7A:
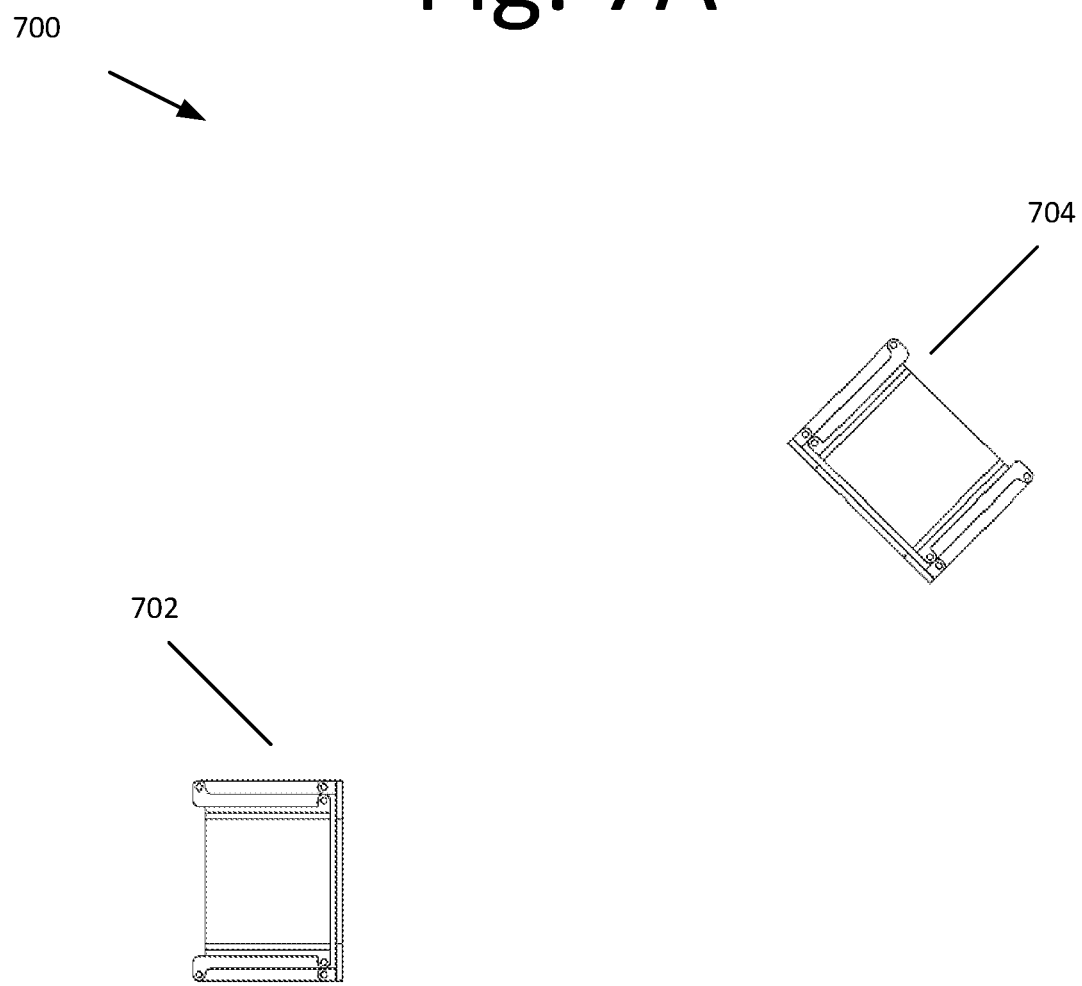
Figure 7B:
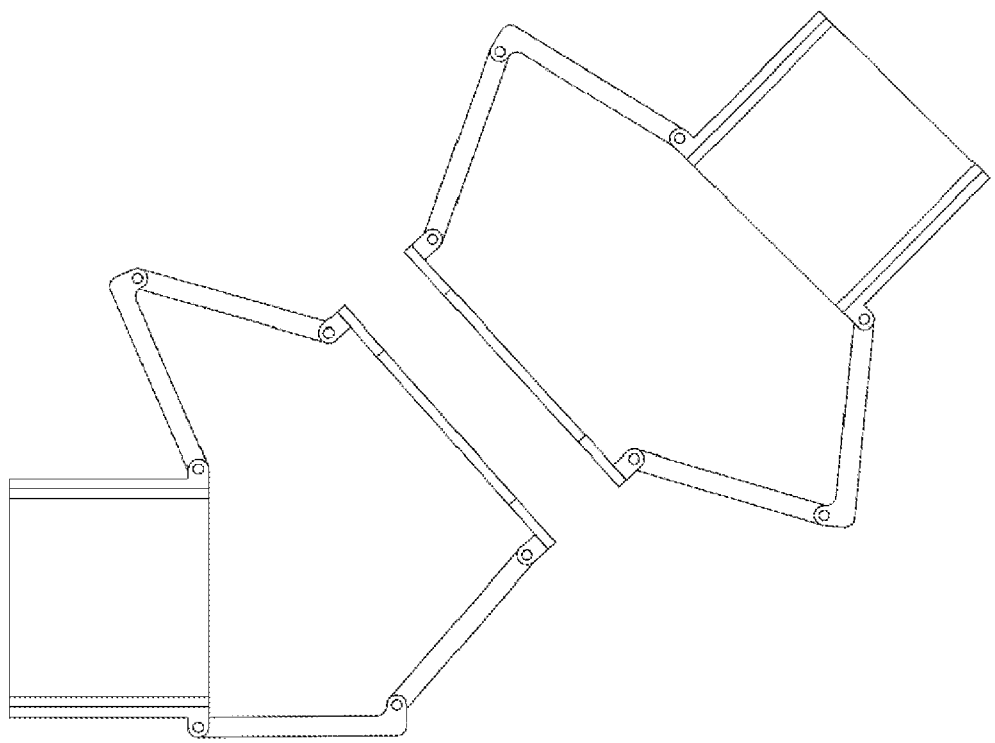

Method 600 may begin at 602 with each SVs' mooring system starting in a fully retracted and stowed position. See, for example, FIG. 7A, which is a diagram illustrating an autonomous mooring system 700 comprising a first mooring system 702 and a second mooring system 704 in a fully retracted and stowed position, according to an embodiment of the present invention. The systems are independently controlled prior to being in deployed and brought into contact. At 604, the systems are extended and guided together by an interaction of the SVs' control systems and the movements of the mooring systems linkages. See, for example, FIG. 7B, which is a diagram illustrating a first mooring system 702 and a second mooring system 704 in an extended position prior to making contact with one another, according to an embodiment of the present invention. Once contact is established, the mooring system at 606 activates the EPM to hold the mooring plates in contact. See, for example, FIG. 7C, which is a diagram illustrating a first mooring system 702 and a second mooring system 704 contacting each other, according to an embodiment of the present invention.

Figure 7D:
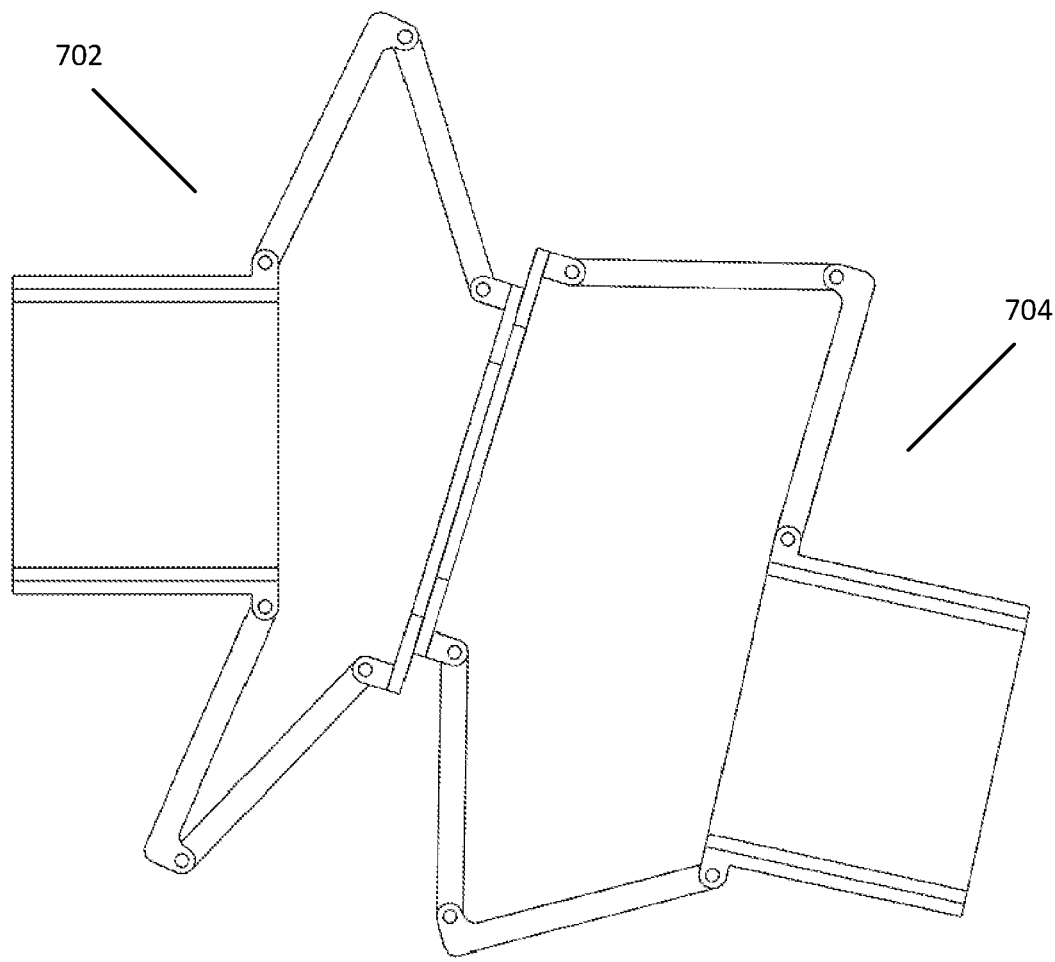

At 608, the mooring systems then transitions to a compliance controller mode, which use a system of sensors, such as LIDAR, optical, or other camera-type systems and torque and force feedback sensors at the joints and linkages to determine the reaction moment and force profiles needed to arrest any residual relative velocities between the SVs. See, for example, FIG. 7D, which is a diagram illustrating a first mooring system 702 and a second mooring system 704 transitioning to a compliance controller mode, according to an embodiment of the present invention. The system uses the feedback sensors to ensure that no damage to the mooring system occurs during the arresting phase. During this phase, communication is established with the arriving SV to coordinate the movements but is not strictly necessary. If communication is established, additional sophisticated controller schemes can be performed.

At 610, from the arrested state, the primary SV (dock) transitions to an impedance controller mode for its mooring station and the arriving SV transitions to an admittance controller mode for its mooring station. This allows the two systems to coordinate their motion even if communication has not been established. See, for example, FIG. 7D, which is a diagram illustrating a first mooring system 702 transitioning to an impedance controller mode and a second mooring system 704 transitioning to an admittance controller mode, according to an embodiment of the present invention. In some embodiments, the systems transition to impedance/admittance controller modes once motion has been arrested. Subsequently, the systems move to the alignment position and makes adjustments as described below.

Figure 7E:
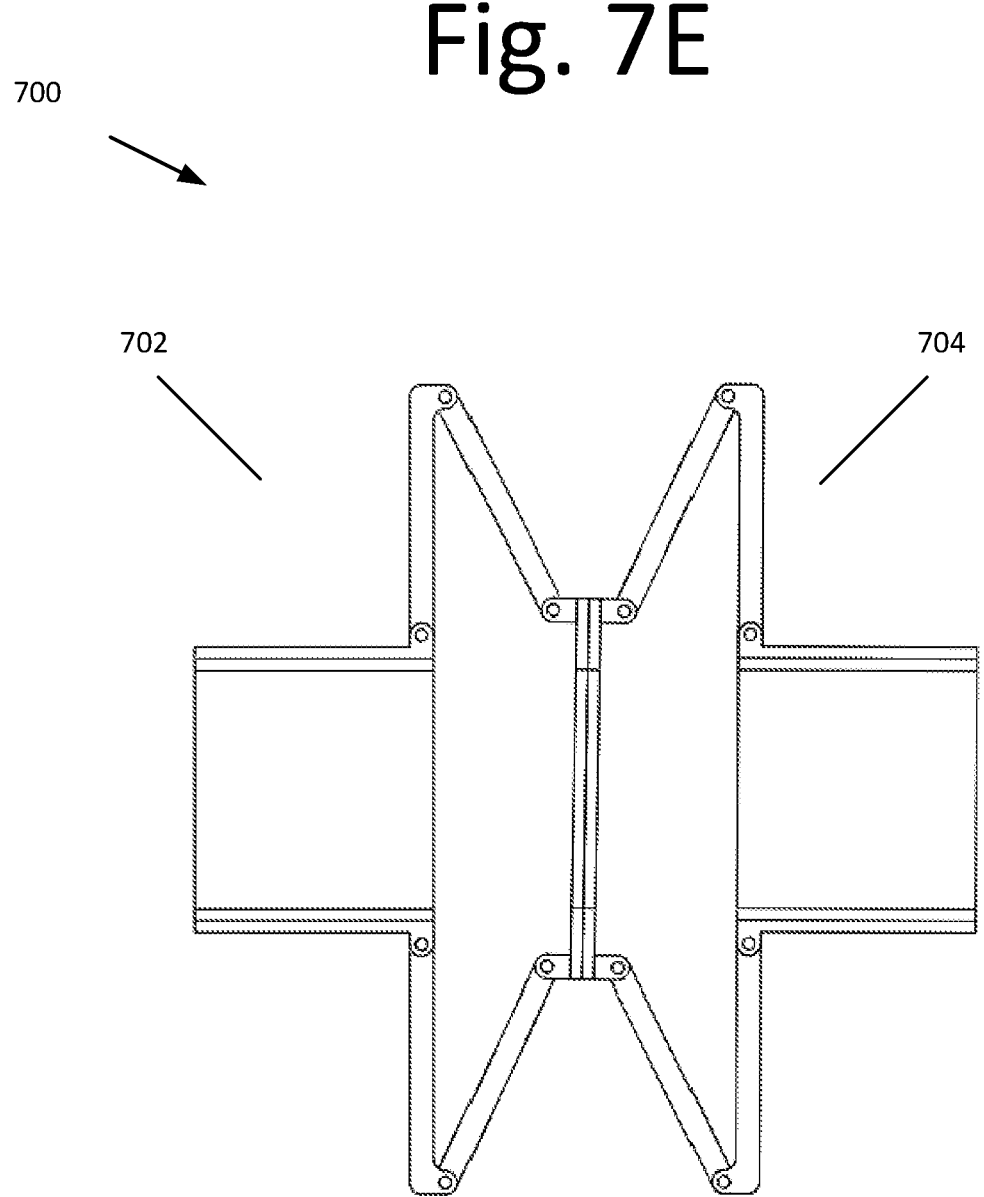

At 612, the system aligns the mooring plates by releasing the EPM clamp and adjusting the position of the mooring plates to remove any initial misalignments incurred during the initial contact event. Once the alignment has been corrected, the EPM clamp is reengaged. See, for example, FIG. 7E, which is a diagram illustrating a first mooring system 702 and a second mooring system 704 transitioning to an aligned state, according to an embodiment of the present invention.

Figure 7F:
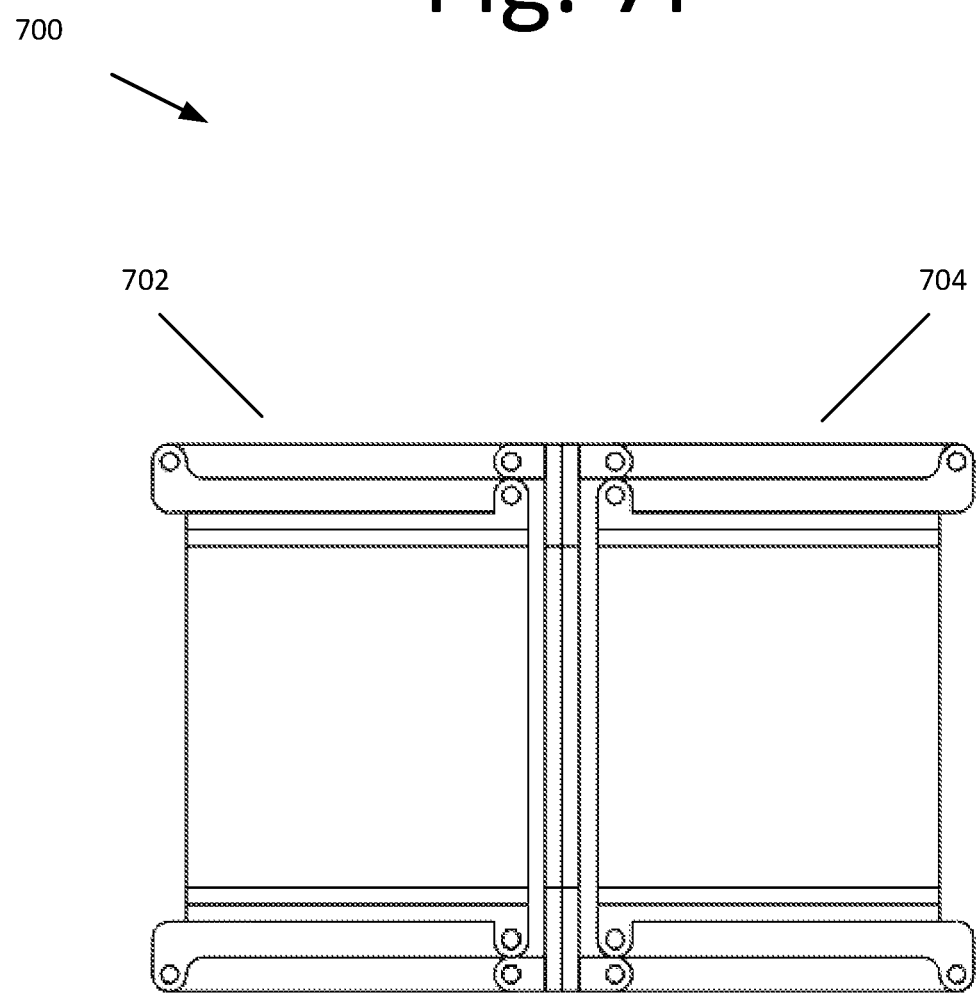

At 614, the systems then retract the mooring linkages to their fully retracted and stowed position ending the mooring operations. See, for example, FIG. 7F, which is a diagram illustrating a first mooring system 702 and a second mooring system 704 retracting the mooring linkages to their fully retracted and stowed positions, according to an embodiment of the present invention.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An autonomous mooring system, comprising:
a pair of mooring systems connected to each other by way of a pair of mooring interfaces, wherein
the pair of mooring interfaces is configured to switch a state of the pair of mooring systems from a mooring state to a release state and visa-versa,
one of the pair of mooring interfaces comprises an electropermanent magnet (EPM) and the other one of the pair of mooring interfaces comprises a ferromagnetic plate,
the EPM and the ferromagnetic plate are configured to connect the pair of mooring systems together, and
each of the pair of mooring interfaces is attached to two compliance controlled mechanisms configured to react externally applied forces and moments in a manner allowing for variable levels of compliance.

2. The system of claim 1, wherein the one of the pair of mooring interfaces comprising the EPM further comprises a contactor plate,
the contactor plate comprising a plurality of contactors placed around the EPM.

3. The system of claim 1, wherein, after contact is established between the pair of mooring interfaces, the two compliance-controlled mechanisms are further configured to maneuver the pair of mooring systems into the retracted state.

4. The system of claim 3, wherein, during the retracted state, the two compliance-controlled mechanisms transition to a high compliance/low stiffness state when a resulting force exceeds a desired threshold.

5. The system of claim 4, where, when an applied load exceeds a load threshold, the two compliance control mechanisms are further configured to switch states, allowing the pair of mooring systems to move away from each other.

6. The system of claim 1, wherein the two compliance control mechanisms comprise one or more embedded sensors configured to capture force and moment data,
the force and moment data are processed via algorithms in an embedded processor and compared to stored values to determine if a threshold value is exceeded.

7. An autonomous mooring system, comprising:
a pair of mooring systems connected to each other by way of a pair of mooring interfaces, wherein
the pair of mooring interfaces is configured to switch a state of the pair of mooring systems from a mooring state to a release state and visa-versa,
one of the pair of mooring interfaces comprises an electropermanent magnet (EPM) and the other one of the pair of mooring interfaces comprises a ferromagnetic plate,
the electropermanent magnet and the ferromagnetic plate are configured to connect the pair of mooring systems together, and
each of the pair of mooring interfaces is attached to two compliance controlled mechanisms configured to react externally applied forces and moments in a manner allowing for variable levels of compliance.

8. The system of claim 7, wherein the one of the pair of mooring interfaces comprising the EPM further comprises a contactor plate,
the contactor plate comprising a plurality of contactors placed around the EPM.

9. The system of claim 7, wherein, after contact is established between the pair of mooring interfaces, the two compliance-controlled mechanisms are further configured to maneuver the pair of mooring systems into the retracted state.

10. The system of claim 9, wherein, during the retracted state, the two compliance-controlled mechanisms transition to a high compliance/low stiffness state when a resulting force exceeds a desired threshold.

11. The system of claim 10, where, when an applied load exceeds a load threshold, the two compliance control mechanisms are further configured to switch states, allowing the pair of mooring systems to move away from each other.

12. The system of claim 11, wherein the two compliance control mechanisms comprise one or more embedded sensors configured to capture force and moment data,
the force and moment data are processed via algorithms in an embedded processor and compared to stored values to determine if a threshold value is exceeded.

13. An autonomous mooring system, comprising:
a pair of mooring systems connected to each other by way of a pair of mooring interfaces, wherein
the pair of mooring interfaces is configured to switch a state of the pair of mooring systems from a mooring state to a release state and visa-versa,
one of the pair of mooring interfaces comprises an electropermanent magnet (EPM) and the other one of the pair of mooring interfaces comprises a ferromagnetic plate, and
the EPM and the ferromagnetic plate are configured to connect the pair of mooring systems together; and
a pair of linking arms comprising cables for powering the EPM, transferring power from a EPM plate to the ferromagnetic plate, and/or providing a serial communication across the pair of mooring interfaces, and
the pair of linking arms are connected to a corresponding one of a pair of compliance controlled mechanisms.

* * * * *